United States Patent [19]

Szabo

[11] 3,921,771
[45] Nov. 25, 1975

[54] CLUTCH FOR PROVIDING INTERMITTENT ROTARY OUTPUT FROM A SOURCE OF CONTINUOUS ROTARY POWER

[75] Inventor: Andrew Thomas Szabo, Euclid, Ohio

[73] Assignee: Marquette Metal Products Co., Cleveland, Ohio

[22] Filed: July 29, 1974

[21] Appl. No.: 492,635

[52] U.S. Cl. ................ 192/12 BA; 64/29; 74/125.5
[51] Int. Cl.² ......................................... F16D 67/02
[58] Field of Search......... 192/12 BA:12 B; 74/125.5

[56] References Cited
UNITED STATES PATENTS

| 2,509,791 | 5/1950 | Swanson | 192/12 B X |
| 3,232,399 | 2/1966 | Harned et al | 192/12 BA |
| 3,559,781 | 2/1971 | Brunelle | 192/12 BA |
| 3,817,359 | 6/1974 | Haupt | 192/12 B |

*Primary Examiner*—Benjamin W. Wyche
*Attorney, Agent, or Firm*—Arthur Frederick; Victor Behn

[57] ABSTRACT

The clutch for providing intermittent rotative output from a source of continuous rotary power has a fixed member supporting an input drum continuously rotated by the power source and an output drum supported for rotation adjacent the input drum. A torque means is provided to coact with said input drum and output drum to effect intermittently rotative engagement of the drums to provide intermittent conjoined rotation of the input and output drums. A coil spring is disposed to grip the output drum and a fixed member to arrest rotation of the output drum after limited conjoined rotation of the input and output drums. The torque means also includes means for disengaging the input and output drums when rotation of the output drum is arrested by the coil spring. The output drum is connected to an output member, via a one-way clutch means, to prevent rotation of the latter when the output drum is returned by reverse rotation to its original position by force of the coil spring, which force is stored in the coil spring upon braking of the output drum.

17 Claims, 7 Drawing Figures

CLUTCH FOR PROVIDING INTERMITTENT ROTARY OUTPUT FROM A SOURCE OF CONTINUOUS ROTARY POWER

This invention relates to clutches and more particularly to clutches which are to effect intermittent rotative output from a source of continuous rotary input.

BACKGROUND OF THE INVENTION

In business machines and conveying systems it is frequently necessary to provide intermittent output rotation utilizing a source of continuously rotating input. Many of the apparatuses such as exemplified in the U.S. Pat. No. 3,186,530, to Petroff, while effective devices, are too complex and expensive for certain applications where precise indexing is not required. The present invention rectifies this shortcoming of presently known clutches, particularly of the spring clutch type.

Accordingly, it is an object of this invention to provide a clutch which is capable of transmitting intermittent rotation from a source of continuous rotary power and is relatively simple in construction and relatively inexpensive to fabricate.

SUMMARY

The present invention, therefore, contemplates a clutch comprising input and output drums supported on a fixed support structure and a brake means, all of which coact to provide intermittent rotative output from a source of continuous rotary input. More specifically, the input drum is connected to a suitable source of rotary power, such as an electric, or fluid motor, while the output drum is connected to an output member. A torque is provided to coact with said input drum and output drum to intermittently engage said input drum with the output drum and cause, upon such engagement, conjoined rotation of the input and output drums. The brake means coact with the input and output drums of automatically arrest rotation of the output drum after limited conjoined rotation of the input and output drums. The torque means includes means for rotatively disengaging from the output drum when the output drum rotation is arrested by the brake means so that the input drum can rotate relative to the input drum and transmission of rotation to the output drum is thereby interrupted without stopping input rotation.

In a more specific aspect of the invention, the brake means is a coil spring which, when energized by rotation of the output drum, has its coils contracted to grip the output drum and fixed support to thereby stop rotation of the output drum after limited rotative movement. A one-way clutch means is interposed between the output drum and output member to allow relative rotation therebetween in reverse direction when the output drum is returned to substantially its initial position under the urging of the stored torque force in the spring, which force is released upon de-energization of the spring.

In one embodiment of the invention the torque means comprises a spring loaded pin carried by the input drum which pin engages and disengages from an abutment on said output drum.

In another embodiment, the torque means comprises a radially resilient leaf spring carried by the input drum and constructed and arranged to engage and disengage from an abutment on said output drum.

In a still further embodiment, the torque means comprises a roller means carried by the input drum and a radially resilient leaf spring carried by the output drum to be engaged and disengaged by the roller means.

In an additional embodiment of this invention, where the brake means is a coil spring, a control sleeve is disposed to surround the coil spring. The coil spring is connected at one end, via a tang, to the control sleeve so that by arresting rotation of the control sleeve the spring can be prevented from energizing and thereby provide continuous rotary output instead of intermittent output.

BRIEF DESCRIPTION OF THE DRAWINGS

The invention will be more fully understood from the following detailed description thereof when considered in connection with the accompanying drawing wherein several embodiments of the invention are illustrated by way of example and, in which.

DESCRIPTION OF THE PREFERRED EMBODIMENTS

Figure 1:
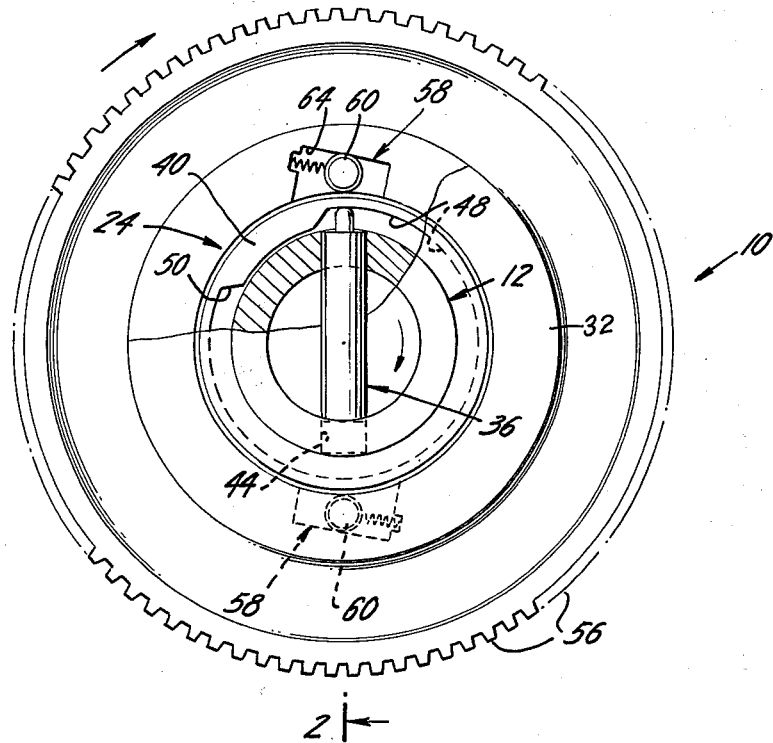
FIG. 1 is an end elevational view of the clutch in accordance with one embodiment of the invention with parts broken away for illustration purposes.
Figure 2:
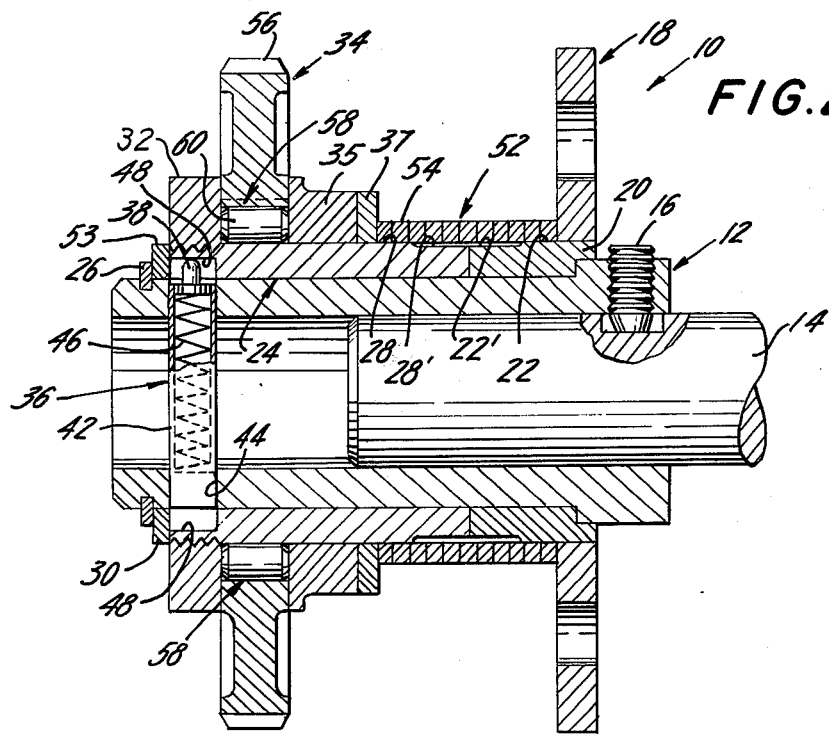
FIG. 2 is a cross-sectional view taken substantially along line 2—2 of FIG. 1.

Now referring to the drawings and, more particularly, FIGS. 1 and 2, the reference number 10 generally designates the clutch according to a first embodiment of this invention. The clutch 10 comprises an input drum 12 which, as shown, may be in the form of a sleeve secured for conjoined rotation to a driveshaft 14 by a set screw 16 or other suitable means. The driveshaft 14 is secured to a suitable source of continuous rotary power (not shown), such as an electric or fluid motor. The input drum 12 and driveshaft 14 may be, as shown, journalled for rotation in a fixed support structure 18, the latter including a tubular portion 20, the outer periphery of which forms a braking surface 22.

An output drum 24 in the form of a tubular element is disposed coaxially over input drum 12 and in abutment against tubular portion 20 of support structure 18. The output drum 24 has an internal diameter dimensioned to permit it to freely rotate relative to input drum 12 and is held against axial movement by a retaining ring 26 secured in an annular groove in the outer peripheral surface of input drum 12. The output drum 24 is also provided, at one end adjacent braking surface 22 of support structure 18, with an outer peripheral portion forming a braking surface 28 lying substantially coextensive with braking surface 22. The opposite outer peripheral portion of output drum 24 is threaded at 30 to receive a retaining member 32 which forms part of an output member or assembly 34 as hereinafter more fully described. To effect intermittent rotative engagement of input drum 12 and output drum 24, a torque means 36 is interposed between the input and output drums.

As shown in FIGS. 1 and 2, torque means 36 comprises, according to this first embodiment of the invention, a detent consisting of a pin 38 and an abutment 40 (see FIG. 1). The pin 38 is slidably supported in a tubular member 42 which is radially disposed in suitable diametrically aligned holes 44 in input drum 12 and closed at its end opposite pin 38. A spring 46 is disposed in member 42 to bias pin 38 radially outwardly into an annular groove 48 in the inner surface of output drum 24. The abutment 40 has at one end an inclined shoulder or ridge 50 which lies in the path of rotation of pin 38 so that the latter abuts the ridge. When pin 38 engages ridge 50 as it is rotationally carried by the input drum 12, it imposes a torque force on the output drum and causes output drum 24 to rotate with the input drum. To limit the conjoined rotation of input drum 12 and output drum 24, a brake means 52, which includes braking surfaces 22 and 28, is provided to arrest rotation of output drum 24. A washer 53 is disposed between retaining ring 26 and the end of output drum 24 to cover groove 48 and protect the groove and torque means 36 from dirt and grit and other interference with its operation.

The brake means 52, as illustrated, includes a coil spring 54, the coils of which are so dimensioned that the opposite endmost coils of the spring, when assembled, are preloaded and are in interference fit with braking surfaces 22 and 28. The brake means 52 also includes, adjacent reduced diameter portions of output drum 24 and portion 20 over which lie the middle portion of the coils of spring 54, the reduced diameter portions forming primary braking surfaces 28' and 22' on output drum 24 and portion 20 of support structure 18. In operation, when spring 54 is energized upon rotation of output drum 24, the coils of the spring are caused, by virtue of the direction of the wind ("hand") of the coil spring in relation to such direction of the output drum rotation, to contract and grip surfaces 22' and 28' and, thus, directly couple output drum 24 to the fixed support structure 18 and thereby arrest rotation of the output drum.

As illustrated in FIGS. 1 and 2, output member 34 may include a gear 56, or sprocket, reel, ratchet wheel, pulley wheel, and the like, which may have a hub portion 35 as shown. The gear 56 is held for rotation on output drum 24 between retaining member 32 and a spacer ring 37 disposed between coil spring 54 and hub portion 35 of the gear. If it is desired to prevent reverse rotation of output member 34 upon release or de-energization of coil spring 54, a one-way clutch 58 may be interposed between the output drum and gear 56. The one-way clutch 58 may be of any suitable type, as for example, such as those disclosed in the U.S. Pat. No. 3,542,160 Sacchini; Gillett, U.S. Pat. No. 1,915,885; Sacchini, U.S. Pat. No. 3,539,042; and Janson, U.S. Pat. No. 3,714,837. For illustration purposes, one-way clutch 58 is shown as comprising a plurality of rollers 60 disposed in grooves 62 in the inner peripheral surface of the hub portion of the gear 56. Each of the groove 62 have an inclined surface 64 relative to imaginary tangential plane to the peripheral surface of output drum 24 at the point of contact of roller 60 associated with the groove. The inclined surfaces 64 are inclined so that, in the direction to transmit rotation from output drum 24 to gear 56, the rollers are wedged between the surfaces 64 and the peripheral surface of the output drum and, in the reverse direction of rotation the rollers move to a non-wedging position so that output drum 24 can rotate relative to gear 56. This reverse rotation of output drum 24 occurs by reason of the torque force which is stored in coil spring 54 during the contraction of the coils of coil spring 54 for braking when the coil spring is de-energized or released.

In operation of spring clutch 10, assuming a clockwise direction of rotation of driveshaft 14 and input drum 12 as indicated by the arrow in FIG. 1, pin 38 is rotatively carried by input drum 12 into engagement with ridge 50 of abutment 40 of output drum 24. The force of spring 46 on pin 38 is such as to maintain the pin in contact with ridge 50 so that the inertial load on output drum 24 and output member 34 is overcome and the output drum 24 is also rotated in a clockwise direction with input drum 12. The shock of impact at initial engagement of pin 38 and ridge 50 is absorbed by compression of spring 46 as pin 38 rides along ridge 50. As output drum 24 is rotatively moved, coil spring 54 of brake means 52 is energized by reason of the interference fits of the opposite endmost coils on braking surfaces 28 and 22 and the coils of the spring contract until sufficient rotation of output drum 24 occurs to contract the coils into tight gripping relationship with the primary braking surfaces 28' and 22'. When the coils tightly grip surfaces 22' and 28', rotation of output drum 24 is arrested since, via energized coil spring 54, the output drum is directly coupled to fixed support structure 18. With rotation of output drum 24 arrested and continued rotation of input drum 12, pin 38 rides free of ridge 50, thus terminating the torque force imposed on output drum 24. The torque force directed in the opposite or counterclockwise direction and stored in coil spring 54 during contraction of the coils of the coil spring is released when pin 38 rotatively disengages from output drum 24 and allows spring coils to unwind. This counterclockwise directed torque force causes output drum 24 to rotate back to substantially an initial starting position it has prior to the engagement of pin 38 with ridge 50. During this reverse rotation of output drum 24, one-way clutch 58 rotatively disengages the output drum from output gear 56 so that such reverse rotation is not transmitted to the output gear. After pin 38 disengages from ridge 50, it continues to rotate in a clockwise direction past abutment 40. After pin 38 passes abutment 40, spring 46 urges pin 38 radially outward so that upon continued rotation of input drum 12 pin 38 again engages ridge 50 and effects a repetition of the sequence of limited rotation of output drum 24 and output member 34 is repeated. Thus, the clutch 10 effects intermittent rotative movement of an output member 34 from a source of continuous rotary power.

Figure 3:
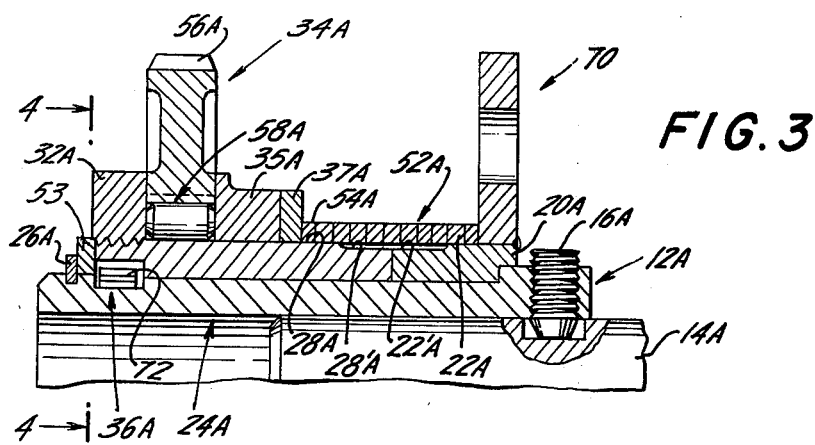
FIG. 3 is a fragmentary view similar to FIG. 2 and showing a second embodiment of this invention.
Figure 4:
FIG. 4 is a view in cross-section taken substantially along line 4—4 of FIG. 3.
Figure 4:
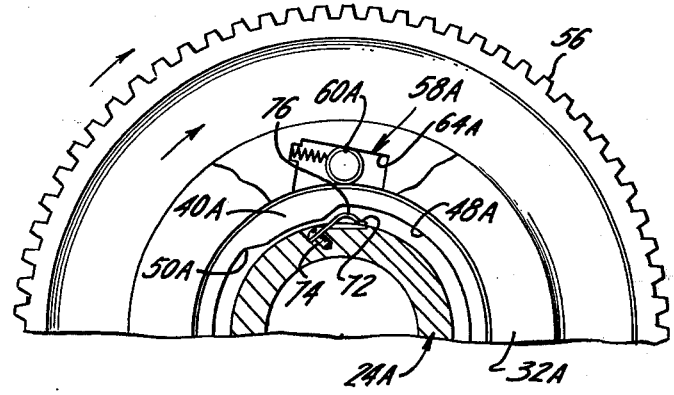

In FIGS. 3 and 4 is shown a clutch 70 according to a second embodiment of this invention, which clutch only differs from clutch 10 shown in FIGS. 1 and 2 in that the torque means 36 of clutch 10 is modified. Accordingly, parts of clutch 70 corresponding to like parts of clutch 10 will be designated by the same reference number with the suffix A added thereto.

As illustrated in FIGS. 3 and 4, torque means 36A comprises, instead of spring loaded pin 38 of clutch 10, a leaf type spring 72 secured in any suitable manner at one end, such as a screw 74, to input drum 12A. The spring 72 is formed to provide at its distal end a curved portion 76 projecting into the path of abutment 40A to abut ridge 50A of the abutment and effect rotation of output drum 24A. The curved portion 76 of spring 72 is movable radially to ride along ridge 50A and disengage from ridge 50A when rotation of output drum 24A is arrested. The inherent resiliency of spring 72 returns the curved portion 76 to a position in the path of abutment 40A for re-engagement with rigid 50A. The operation of clutch 70 is the same in all other respects as has been described for clutch 10.

Figure 5:
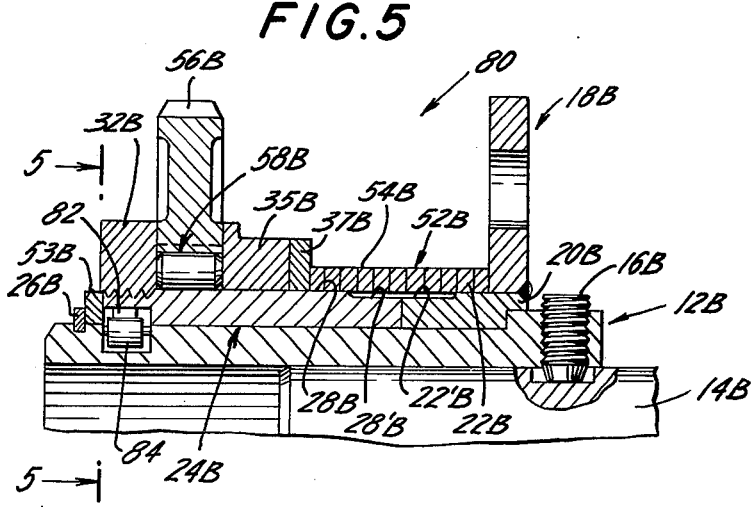
FIG. 5 is a fragmentary view similar to FIG. 3 and showing a third embodiment according to the present invention.
Figure 6:
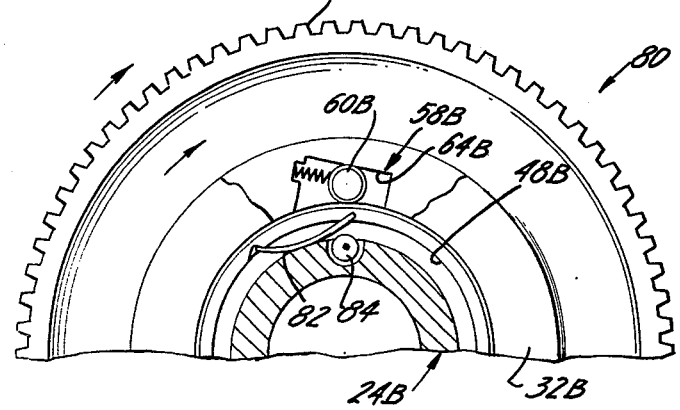
FIG. 6 is a cross-sectional view taken substantially along line 6—6 of FIG. 5.

In FIGS. 5 and 6 is shown a clutch 80 according to a third embodiment of this invention which clutch differs from clutches 10 and 70 in that an alternative torque means is employed to effect intermittent rotation of the output drum and output member. In view of the similarity of clutch 80 and clutches 10 and 70, the parts of clutch 80 corresponding to like parts of clutches 10 and 70 will be designated by the same number with the suffix B added thereto.

As shown in FIGS. 5 and 6 of the drawings, torque means 36B of clutch 80 comprises a curved leaf type spring element 82 secured to output drum 24B and coacting with a roller 84 carried by the input drum 12B in the path of spring element 82. The spring element 82 is secured at one end 86 and free at the opposite end so that it is capable of flexing out of the path of roller 84 when output drum rotation is stopped and the roller 84 moves relative to spring element 82. In operation of clutch 80, roller 84, when it is carried into abutment with spring element 82, effects rotation of output drum 24B and output member 34B until rotation of the output drum is stopped. Thereafter, roller 84 rolls along the surface of spring element 82, flexing the latter radially outwardly until the roller 84 rides free of spring element 82. In all other respects the operation of clutch 80 is the same as described for clutches 10 and 70.

Figure 7:
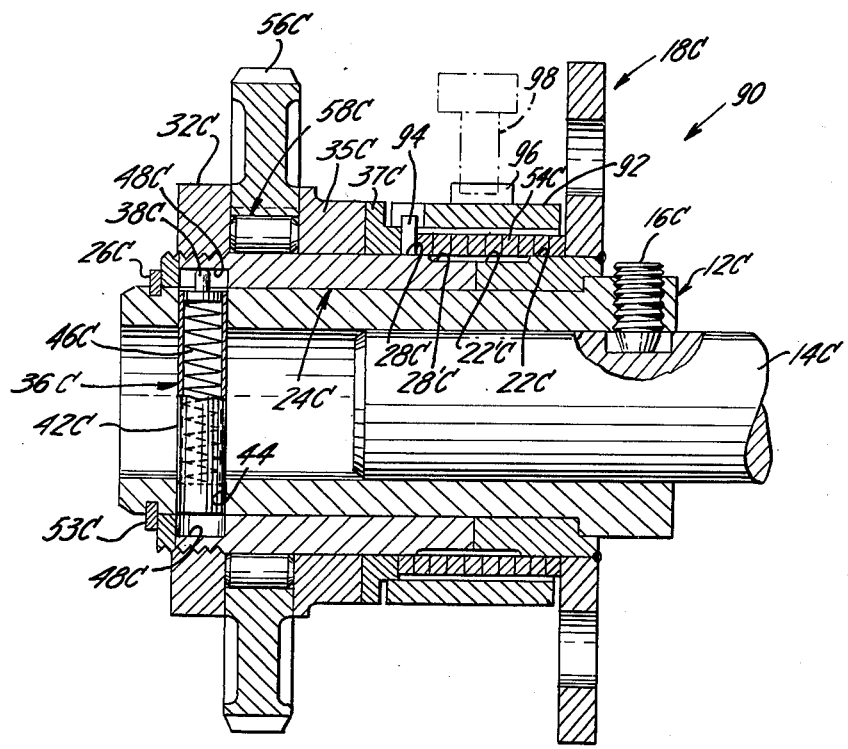
FIG. 7 is a view in cross-section, similar to FIG. 1 and illustrating a fourth embodiment of this invention.

In FIG. 7 is illustrated a clutch 90 according to a fourth embodiment of this invention. This clutch is identical to clutch 10 shown in FIGS. 1 and 2 except for that the brake means 52 of clutch 10 is modified as hereinafter explained. In view of the similarity of clutches 10 and 90, parts of clutch 90 corresponding to like parts of clutch 10 will be designated by the same reference number with a suffix C added thereto.

As shown in FIG. 7, brake means 52C of clutch 90 comprises a control sleeve 92 which is supported to surround in close spaced relationship coil spring 54C by annular flange portions 93 of spacer ring 37C and support structure 18C. The control sleeve 92 is connected to one end of coil spring 54C by a radially extending tank 94 projecting from one end of the coil spring. The control sleeve 92 has a stop lug or shoulder 96 on the outer peripheral surface which shoulder 96 is constructed and arranged to be engaged by a suitable stop member, such as a solenoid actuated pin 98 shown in broken lines in FIG. 7. The control sleeve 92 functions, when rotation is arrested by engagement of pin 98 with shoulder 96, to prevent energization of coil spring 54C and contraction of the coils of the coil spring. By thus preventing braking of output drum 24C, the clutch is capable of being selectively switched from intermittent output operation to continuous output operation and vice versa. With control sleeve 92 free to rotate with coil spring 54C, via tang 94, the operation of clutch 90 is the same as described for clutch 10 of FIGS. 1 and 2.

It is now believed readily apparent that the present invention provides a clutch which is relatively simple in construction and inexpensive to fabricate and capable of achieving intermittent output rotation from a source of continuous rotary input. In another aspect of the invention, the clutch is capable of being selectively switched from intermittent to continuous rotary output and vice versa.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A clutch for providing intermittent rotary output from a source of continuous rotary power comprising:
   a. fixed support structure;
   b. an input drum connected to said source of continuous rotary power and supported for rotation by said fixed support structure;
   c. an output drum supported for rotation relative to said input drum;
   d. detent means coacting with said input drum and output drum to intermittently engage said outer drum with said input drum and cause conjoined rotary movement of the output drum and input drum;
   e. brake means coacting with the output drum upon rotation thereof to arrest rotation of the latter after limited rotary movement of the output drum;
   f. said torque means including means for rotatively disengaging said input drum and the output drum upon cessation of rotation of the output drum by said brake means and thereby permitting said input drum to rotate relative to the output drum.

2. The apparatus of claim 1 wherein said detent comprises a first stop means carried by said input drum and a second stop means carried by the output drum, at least one of said first and second stop means being resiliently movable relative to the other to permit relative rotative movement between the input and output drums when rotation of the latter is stopped.

3. The apparatus of claim 2 wherein said first stop means is a plunger carried in the input drum for radial reciprocative movement and resiliently biased outwardly relative to the input drum.

4. The apparatus of claim 3 wherein said second stop means is a radially inwardly extending abutment projecting into the path of rotation of said first stop means.

5. The apparatus of claim 2 wherein said first stop means is a bowed leaf spring element secured at one end to the input drum.

6. The apparatus of claim 2 wherein said first stop means is a rolling element carried in an orbital path by the input drum.

7. The apparatus of claim 6 wherein said second stop means is a resilient leaf element disposed within the path of orbital travel of said rolling element.

8. The apparatus of claim 1 wherein said brake means comprises a coil spring extending to surround at least a portion of said output drum and a braking surface on said fixed support structure to grip said input drum portion and the braking surface when in the braked condition of operation.

9. The apparatus of claim 8 wherein one-way clutch means is interposed between the output drum and an output driven member so that reverse rotation of the latter is prevented when the torsional force stored in the coil spring is released.

10. A clutch connected to a source of continuous rotary power comprising:
    a. a fixed support structure;

b. an input drum connected for continuous rotation to a source of rotary power and supported for rotation by said fixed support structure;
c. an output drum supported for rotation and coaxially surrounding said input drum;
d. said fixed support structure having a first braking surface portion;
e. said output drum having a second braking surface adjacent to the first braking surface;
f. a coil spring overlying said first and second braking surfaces;
g. said end portions of said coil spring being connected with said first and second braking surfaces to be energized by rotation of said output drum to effect contraction of the other coils of said coil spring on said first and second braking surfaces to arrest rotation of the output drum;
h. detent means coacting with said input drum and said output drum to effect in one operative position engagement of said input drum and output drum and cause thereby rotative movement of the otuput drum until such movement energizes the coil spring to arrest the rotative movement of the output drum and, in another position of operation upon cessation of rotation of said output drum, rotatively disengage said input and output drums so that the input drum is permitted to rotate relative to the input drum;
i. a driven output member supported for rotation adjacent said output drum; and
j. one-way clutch means disposed between said output drum and driven output member to effect conjoined rotation of the output drum and driven output member when the output drum is rotated by the input drum and permit rotation of the output drum in the opposite direction under the stored torsional force in the coil spring without transmission of such opposite rotation to said driven output member.

11. The apparatus of claim 10 wherein said opposite end portions of the coil springs are preloaded to be in interference fits with the first and second braking surfaces.

12. The apparatus of claim 10 wherein said first and second braking surfaces have reduced diameter portions to form annular surfaces spaced from the other coils of the coil spring and which annular surfaces are gripped by such other coils when the coil spring is energized.

13. The apparatus of claim 10 wherein said detent means is a spring loaded pin carried radially in said input drum and extending therefrom and coacting with an abutment carried by the output drum in the path of travel of said pin.

14. The apparatus of claim 10 wherein said detent means is a resilient member coacting with an abutment member, the members being carried by said input and output drums in rotative alignment so as to engage each other upon rotation of said input drum.

15. The apparatus of claim 14 wherein said resilient member is a flat-deformed leaf spring element secured at one end portion and free at the opposite end portion.

16. The apparatus of claim 14 wherein said detent means is a resilient flat-deformed lead spring coacting with a roller, the leaf spring and roller being carried by said input and output drums in rotative paths of each other so as to come into engagement upon rotation of the input drum.

17. The apparatus of claim 10 wherein a control sleeve is disposed to overlie the coil spring and wherein the spring is connected at one end to said sleeve so that when said control sleeve is held against rotation energization of the coil spring is prevented and thereby prevents braking and provides continuous rotation of the output drum.

* * * * *